US 6,557,574 B2

(12) United States Patent
Federspiel

(10) Patent No.: US 6,557,574 B2
(45) Date of Patent: May 6, 2003

(54) PRESSURE BASED FLOW RATE MEASUREMENT DEVICE INTEGRATED WITH BLADES OF A DAMPER

(76) Inventor: Clifford C. Federspiel, 721 Avila Pl., El Cerrito, CA (US) 94530

( * ) Notice: Subject to any disclaimer, the term of this patent is extended or adjusted under 35 U.S.C. 154(b) by 57 days.

(21) Appl. No.: 09/825,468

(22) Filed: Apr. 2, 2001

(65) Prior Publication Data

US 2002/0020446 A1 Feb. 21, 2002

Related U.S. Application Data

(60) Provisional application No. 60/194,659, filed on Apr. 4, 2000.

(51) Int. Cl.$^7$ .............................. F17D 3/01; G01F 1/42
(52) U.S. Cl. ...................... 137/12; 137/487.5; 137/557; 73/861.62
(58) Field of Search ............................ 137/487.5, 557, 137/12; 73/861.62

(56) References Cited

U.S. PATENT DOCUMENTS

| | | | | |
|---|---|---|---|---|
| 1,098,247 A | * | 5/1914 | Gibbs ...................... | 73/861.62 |
| 1,946,319 A | * | 2/1934 | Hodgson et al. ......... | 73/861.62 |
| 3,640,307 A | * | 2/1972 | Drzala ........................ | 137/557 |
| 3,695,105 A | * | 10/1972 | Carlson ................... | 73/861.62 |
| 4,026,321 A | | 5/1977 | Kahoe | |
| 4,444,060 A | | 4/1984 | Yamamoto | |
| 4,796,651 A | | 1/1989 | Ginn | |
| 5,125,753 A | * | 6/1992 | Ries et al. ............... | 73/861.62 |
| 5,234,021 A | | 8/1993 | Kozlak | |
| 5,331,995 A | | 7/1994 | Westfall | |
| 5,379,792 A | | 1/1995 | Van Becelaere | |
| 5,730,652 A | | 3/1998 | Van Becelaere | |

* cited by examiner

Primary Examiner—John Rivell
(74) Attorney, Agent, or Firm—Heisler & Associates

(57) ABSTRACT

A differential pressure based flow rate measurement device is provided which is coupled to surfaces of a blade 30 within a damper assembly 10, such as that provided within a variable air volume (VAV) box or within a liquid valve assembly. A blade 30 which includes a leading surface 32 opposite a trailing surface 34 is fitted with a sensing structure 50. The sensing structure 50 includes portions 52, 54 which extend away from the leading surface 32. Sensing holes 56 pass into a hollow interior of the sensing structure 50 and pass on to a pressure sensor 60. A similar sensing structure 50 is also provided extending from the trailing surface 34 which also has sensing holes 56 located therein. The sensing holes 56 coupled to the trailing surface 34 also lead to the pressure sensor 60 so that a differential pressure between the sensing holes 56 on either sides of the blade 30 can be measured. The sensing holes 56 preferably extend in a non-perpendicular orientation with the sensing holes 56 on the leading side of the blade 30 facing at least partially upstream. The sensing holes 56 are effectively positioned for all different orientations of the blade 30 between horizontal/totally open and vertical/totally closed. A position transducer 45 is provided which monitors the orientation of the blade 30. Information relating to the orientation of the blade 30 and the pressure differential between the sensing holes 56 on opposite sides of the blade 30 are utilized together to calculate the flow rate of the air/gas passing through the damper assembly 10.

33 Claims, 4 Drawing Sheets

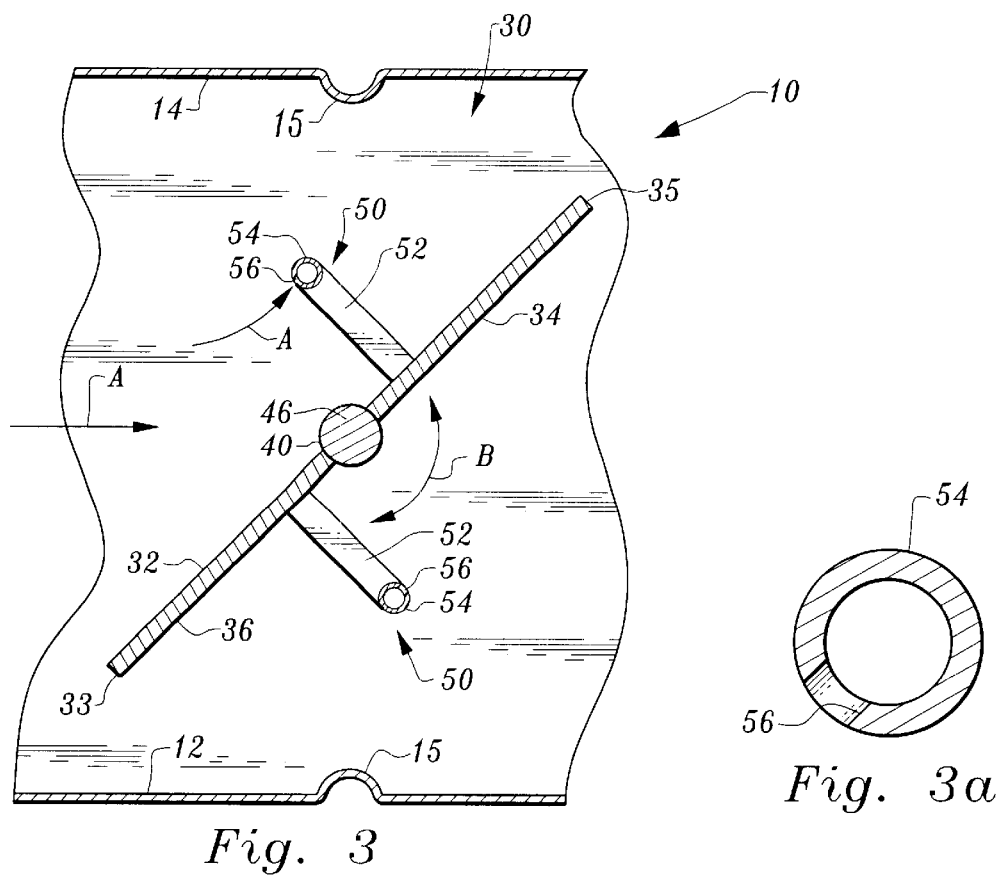
*Fig. 3*
*Fig. 3a*
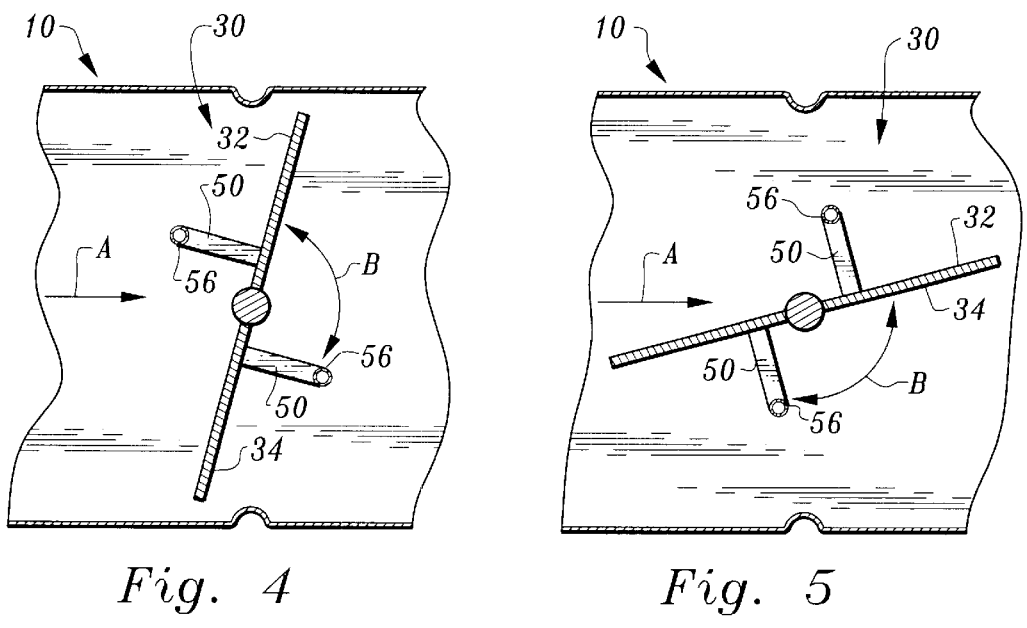
*Fig. 4*
*Fig. 5*

PRESSURE BASED FLOW RATE MEASUREMENT DEVICE INTEGRATED WITH BLADES OF A DAMPER

CROSS-REFERENCE TO RELATED APPLICATIONS

This application claims benefit under Title 35, United States Code §119(e) of U.S. Provisional Application No. 60/194,659 filed on Apr. 4, 2000.

FIELD OF THE INVENTION

The following invention relates to dampers and other devices which are located within ducts which control flow rates of fluids including liquids, air and other gases passing through the ducts. More particularly, this invention relates to dampers with flow rate measurement capabilities included with the damper.

BACKGROUND OF THE INVENTION

Modern buildings typically have complex heating, ventilating and air conditioning systems to efficiently provide comfortable living environments within the buildings. The air handling equipment typically includes networks of ducts for transporting the appropriately conditioned air to various different locations within the building. Among the various types of equipment which are located within such air handling systems are dampers.

Dampers control the flow rate of air or other gases passing along a particular duct by adjustment of the orientation of the damper. Typically, a ventilation system will be carefully designed with the ventilation system requiring particular flow rates during particular operational modes for the system. For the ventilation system to operate according to the design, the ventilation system must receive accurate information regarding what the flow rate is through the damper and be able to precisely adjust the flow rate through movement of the damper.

In typical prior art ventilation systems, flow rate measurement is performed with equipment separate from the damper. For instance, a pitot tube can be provided upstream or downstream from a damper which measures total pressure and static pressure and compares the two pressures to calculate the flow rate of air or other gas passing through the duct. For the pitot tube flow rate sensor to perform adequately, it must be spaced sufficiently far from the damper so that turbulence, such as that particularly caused by a partially closed damper, does not alter the flow rate measurements taken by the pitot tube. Also, such pitot tubes benefit from being spaced away from elbows or other apparatus within the ducts for accurate measurements to be made. Often the duct pathways cannot conveniently provide sufficiently large straight sections for effective flow rate measurement with pitot tubes. Even when such straight sections are available, the placement of the pitot tube flow rate sensor at a location spaced from the damper requires that two separate pieces of equipment be installed within the duct. Accordingly, a need exists for a damper for controlling flow rate and which also includes a flow rate sensor therein.

U.S. Pat. No. 5,730,652 to Van Becelaere teaches a damper with a blade which has openings therein which lead to a pressure differential sensor. One opening is provided in a leading edge of the damper and one opening is provided in a trailing edge of the damper. Van Becelaere utilizes a pressure differential in much the way that a pitot tube operates to measure flow rates present adjacent the surface of the damper itself. While Van Becelaere does incorporate flow rate measurement into the damper itself, Van Becelaere is limited in that the pressure readings are taken directly adjacent the surface of the damper where flow conditions are often disrupted by the orientation of the damper and surface flow irregularities, and are thus subject to imprecision. The Van Becelaere device also requires a replacement damper and is not retrofittable onto an existing damper.

Accordingly, a need exists for a gas flow rate measurement device which can be incorporated into a damper and accurately measure a flow rate of air/gas passing through the damper. Specifically, this need exists both in dampers in air handling units and in variable air volume (VAV) boxes. An analogous need also exists for liquid flow rate measurement devices integrated into fluidic valves within liquid handling systems.

SUMMARY OF THE INVENTION

This invention provides a damper with flow rate measuring pressure sensors attached to the damper assembly but spaced away from surfaces of the blades within the damper assembly. The damper is typically configured as a damper assembly with multiple blades spanning a duct or opening. The damper can also be configured as a valve within a liquid handling system. At least one of the blades, such as the top blade, is fitted with a sensing structure extending from each of the surfaces of the blade. The blade includes a leading surface facing upstream and a trailing surface facing downstream. An axle passes through a core of the blade and is pivotably supported within the duct. A drive is coupled to the axle and can cause a position of the axle to be adjusted between a horizontal blade orientation which leaves the duct essentially unobstructed and a vertical orientation which substantially closes the duct. A position transducer is provided which measures an orientation of the blade and sends this information to an appropriate controller.

The sensing structures provide sensing holes passing thereinto on a portion of each sensing structure which is spaced away from the surfaces of the blade. The sensing holes which are located on the sensing structure attach to the leading surface of the blade most preferably face upstream when the top blade is in its horizontal totally open orientation. In contrast, the sensing holes attached to the sensing structure of the trailing surface face downstream when the blade is oriented in its horizontal totally open orientation.

The sensing holes above the leading surface of the blade encounter pressure which is at least partially due to the velocity of the air passing by the duct. The sensing holes extending from the trailing surface of the blade face at least partially downstream and are located behind the blade and so experience a pressure which does not have an appreciable velocity component. Hence, a pressure differential correlating with the flow rate exists.

The sensing holes adjacent the leading surface pass out of the assembly and on to a pressure sensor. The sensing holes adjacent the trailing surface pass out of the assembly and on to the pressure sensor. The pressure sensor typically is a differential pressure sensor which merely measures a difference in pressure between the sensing holes adjacent the leading surface and the sensing holes adjacent the trailing surface of the blade.

A controller for the damper would typically receive a signal from the pressure sensor indicative of the pressure differential which was measured. This controller would typically also include a signal from the blade position transducer indicative of the exact position of the blade. The controller would then calculate the flow rate based on the pressure differential and the particular orientation of the blade.

Because the sensing holes are located on a sensing structure spaced from the surfaces of the blade, a precise pressure differential correlating with the flow rate of the air is measured, particularly when factoring in the position of the blade at the time that the pressure differential reading was obtained. The controller can then accurately position the blades of the damper assembly in accordance with the overall ventilation system design.

OBJECTS OF THE INVENTION

Accordingly, a primary object of the present invention is to provide a damper which can both control a flow rate of air passing through a duct and measure a flow rate of air passing through the duct.

Another object of the present invention is to provide a flow rate measurement device which is positioned adjacent the blades of a flow rate control damper.

Another object of the present invention is to provide a flow rate measurement device which is coupled to a damper and which measures a position of the blades of the damper as well as a pressure differential between sensing holes on opposite sides of the damper blades.

Another object of the present invention is to provide a flow rate measurement device coupled to a damper which has maximum sensitivity when the blades of the damper assembly are open.

Another object of the present invention is to provide a flow rate measurement device which can accurately and dependably measure a flow rate of air or other gases passing through a duct adjacent a damper over long periods of time without maintenance.

Other further objects of the present invention will become apparent from a careful reading of the included drawing figures, the claims and detailed description of the invention.

BRIEF DESCRIPTION OF THE DRAWINGS

FIG. 3 is a side elevation sectional view of a variation of that which is shown in FIG. 1 where only a single blade within the damper frame is provided similar to the top blade shown in FIG. 1.

FIG. 3A is a detail of a portion of that which is shown in FIG. 3 showing precisely the orientation preferred for the sensing holes within the sensing structure of the blade.

FIG. 4 is a full sectional view similar to that which is shown in FIG. 3 but with the damper blade nearly closed.

FIG. 5 is a full sectional view of that which is shown in FIG. 3 but with the damper blade shown nearly wide open.

FIG. 8 illustrates the minimal deviation encountered throughout the operational regime of the damper assembly and illustrating that maximum gain is provided when the damper is fully open.

DESCRIPTION OF THE PREFERRED EMBODIMENT

Figure 1:
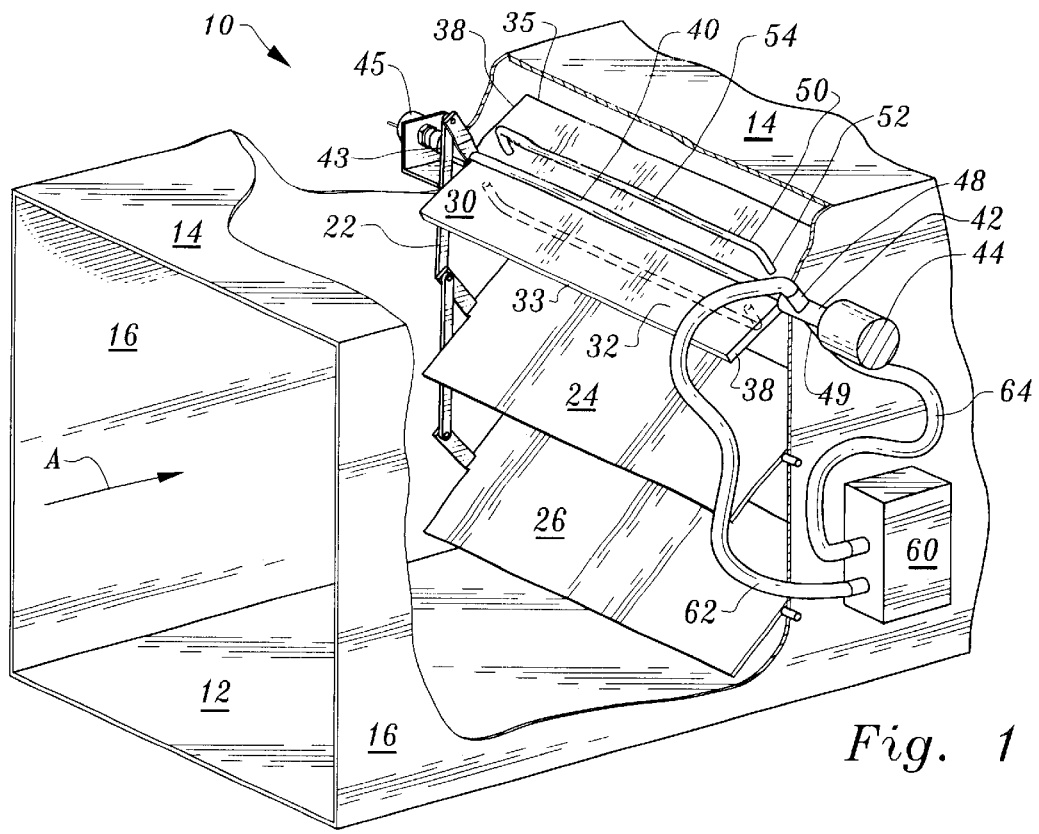
FIG. 1 is a perspective view of a damper frame and duct section box including a damper assembly therein and configured with the sensing structure of this invention for measurement of the flow rate of air passing through the damper.

Referring to the drawings wherein like reference numerals represent like parts throughout the various drawing figures, reference numeral 10 is directed to a unique damper assembly 10 with included pressure sensing for flow rate measurement built therein. The damper assembly 10 both controls the flow rate and measures the flow rate passing through a duct within a ventilation system.

Figure 2:
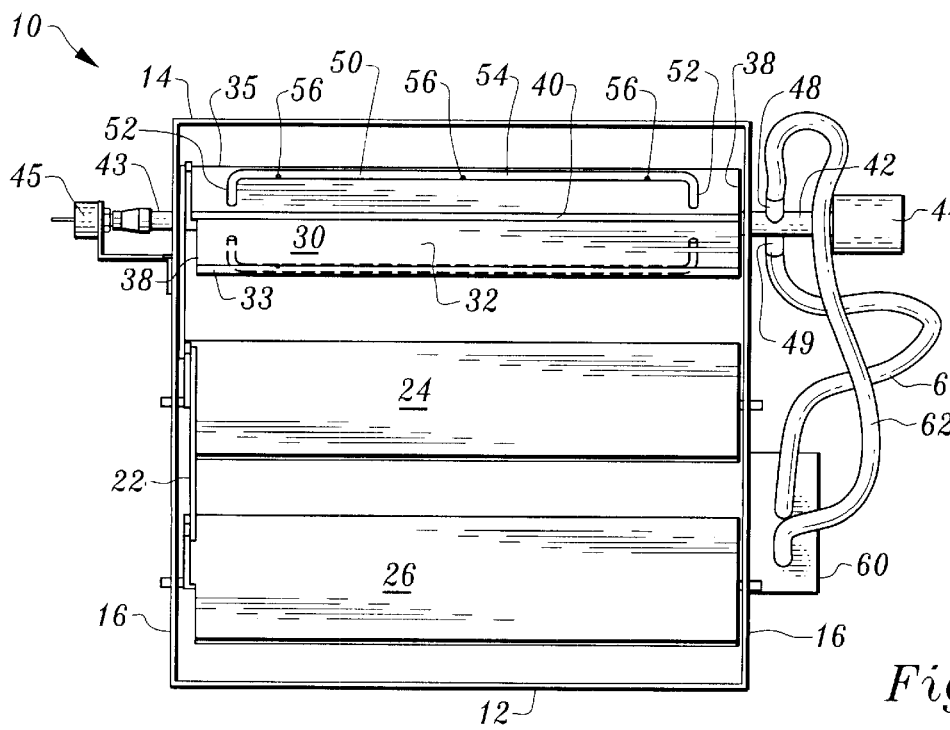
FIG. 2 is a front elevation view of that which is shown in FIG. 1.

In essence, and with particular reference to FIGS. 1–3, the basic details of this invention are described. The damper assembly 10 is adjustable to control a flow rate of air A passing through the assembly 10. The damper assembly 10 includes multiple blades including a top blade 30, which in this preferred embodiment is fitted with the pressure sensing structure 50 of this invention. The top blade 30 has a leading surface 32 which typically faces at least partially upstream and a trailing surface 34 which typically faces at least partially downstream. An axle 40 pivotably supports the top blade 30 within the assembly 10. The axle 40 includes a drive 44 which causes the blade 30 to have an angle of attack/orientation desired by a controller of the ventilation system of which the assembly 10 is a part. A position transducer 45 is also preferably attached to the axle 40 which determines the actual position of the top blade 30.

The sensing structure 50 can take on a variety of different configurations but preferably is provided as shown in FIGS. 1–3. Specifically, the sensing structure 50 includes two perpendicular portions 52 which extend perpendicularly from the leading surface 32 of the top blade 30. A parallel portion 54 joins the two perpendicular portions 52 together. The parallel portion 54 is oriented parallel to the leading surface 32 of the top blade 30. The sensing structure 50 includes sensing holes 56 which preferably face at least partially upstream for most top blade 30 angles of attack. These holes 56 can also be referred to as pressure taps or pressure pick-ups. A similar sensing structure 50 is provided extending from the trailing surface 34 of the top blade 30 but with the sensing holes 56 facing downstream for most top blade 30 orientations.

The sensing holes 56 from both sides of the top blade 30 lead to a common pressure sensor 60 which measures a differential pressure sensed by the sensing holes 56 on either side of the top blade 30. The signal provided by the pressure sensor 60, along with the signal provided by the position transducer 45 provide the necessary information to calculate the flow rate of air/gas passing through the assembly 10.

More specifically, and with particular reference to FIGS. 1 and 2, details of the damper assembly 10 are described. Use of a damper assembly 10 is indicated at locations within the ventilation system where flow rate control is desired. For instance, in a ventilation system for a building outside ventilating air may be provided through the assembly 10 with different flow rates desired for this outside air ventilation at different times and when different components within the overall ventilation system are in operation.

Damper assemblies 10 can come in a variety of different configurations including circular cross-section and square cross-section. Most commonly, damper assemblies 10 are rectangular in cross-section and are surrounded by a planar floor 12 parallel to and spaced from a planar ceiling 14. Side walls 16 extend perpendicularly between the floor 12 and the ceiling 14. Seals 15 (FIG. 3) may be provided to assist in the full closing of a damper/blade 30. Note that FIGS. 1 and 2 show the damper assembly 10 including a middle blade 24, a lower blade 26 and a top blade 30. FIG. 3 shows a single blade 30 sized to operate alone to control flow of air through the damper assembly 10. The flow rate measurement system of this invention is not dependent on the number of blades provided within the damper assembly 10 and so this invention is described and illustrated interchangeably in the figures either as being incorporated into a single blade 30 within a damper assembly 10 or as a blade 30 which functions alone.

It is conceivable that the flow rate measurement system of this invention could be provided on more than one of the blades within a damper assembly 10. Where the damper assembly 10 has multiple blades 24, 26, 30, links 22 are provided so that the blades 24, 26, 30 will all rotate together when adjustment of the flow rate is desired.

With particular reference to FIGS. 1–3, details of the top blade 30 (FIGS. 1 and 2)/singular blade 30 (FIG. 3) are described. The blade 30 is preferably a generally rectangular structure of constant cross-sectional thickness pivotably supported upon an axle 40. The blade 30 includes a substantially planar leading surface 32 extending between a leading edge 33 and a trailing edge 35. A trailing surface 34 is preferably substantially planar and oriented parallel to and opposite the leading surface 32, extending between the leading edge 33 and the trailing edge 35. The blade 30 includes a core 36 between the surfaces 32, 34 and ends 38 (FIGS. 1 and 2) adjacent the side walls 16 of the assembly 10.

While the leading surface 32 typically faces at least partially upstream, the amount that the leading surface 32 faces upstream depends on the orientation of the blade 30. When the blade 30 is in a wide open orientation with an angle of attack of 0°, the blade 30 is oriented parallel to the direction of flow and the leading surface 32 faces neither upstream nor downstream. At all positions other than wide open, the leading surface 32 faces at least partially upstream.

Figure 6:
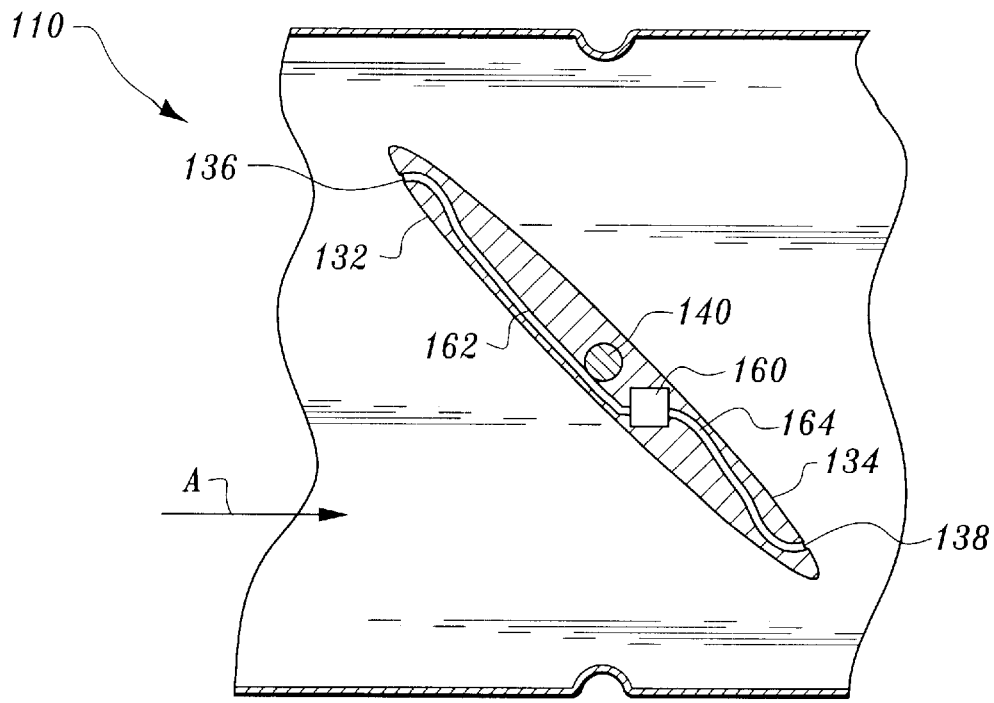
FIG. 6 is a side elevation full sectional view of an alternative embodiment of that which is shown in FIG. 3 where the sensing holes are embedded within contoured leading and trailing surfaces of a streamlined damper and which would share some of the benefits of the preferred embodiment.
Figure 7:
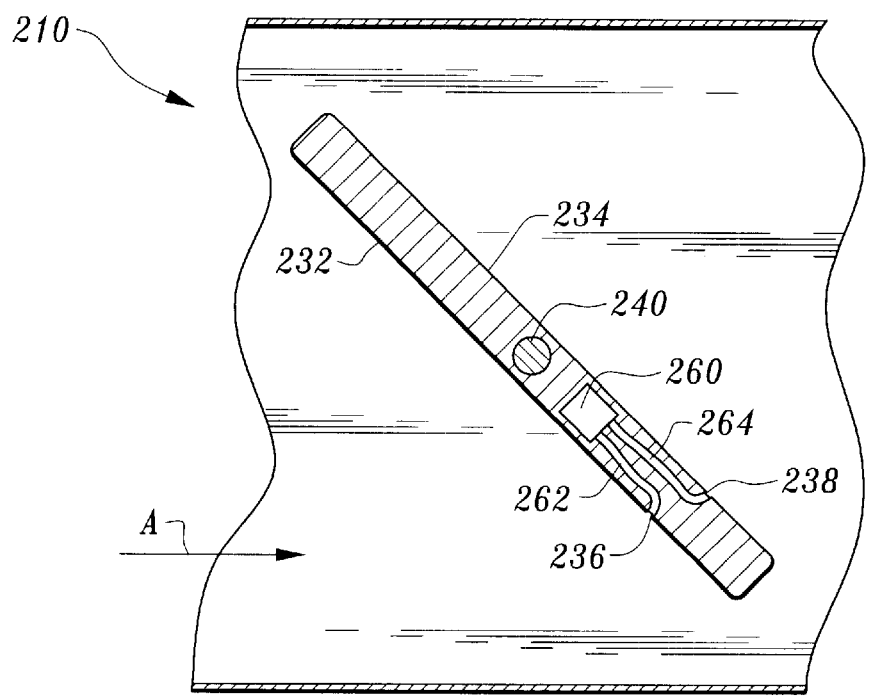
FIG. 7 is a full sectional view of an alternative embodiment of that which is shown in FIG. 3 where sensing holes are merely embedded within the blade and extend from the leading and trailing flat surfaces of a standard rectangular cross-section damper blade.

Similarly, the trailing surface 34 typically faces at least partially downstream, except when the blade 30 is in a wide open orientation where the trailing surface 34 faces neither upstream nor downstream. In this wide open orientation for the blade 30, a leading edge 33 is on an upstream side of the blade 30 and the trailing edge 35 is on a downstream side of the blade 30. In FIGS. 1–5 the leading edge 33 is shown below the axle 40. However, such a configuration is not strictly necessary. For instance, alternative embodiments shown in FIGS. 6 and 7 show the leading edge above the axle.

Preferably, the blade 30 is formed from sufficiently rigid material that the blade 30 does not deflect at all when encountering the air pressure loads typically experienced within air handling ducts, such as those in which the assembly 10 might be located. The blades 30 shown and described are merely the preferred embodiment for the blade 30, but can be appropriately altered and still be adapted to include the flow rate measurement system of this invention.

The blade 30 is rotatably supported upon the axle 40. Preferably, the axle 40 extends horizontally through each of the side walls 16 adjacent the assembly 10. Alternatively, the axle 40 can have any of a variety of different orientations, so long as the axle is capable of rotating the blade 30. The axle 40 includes a first end 42 opposite a second end 43. A drive 44 is attached to the first end 42 and is capable of altering an orientation of the blade 30. Preferably, the drive 44 is a stepper motor which can be precisely and accurately controlled by an appropriate controller which sends a signal to the drive 44, causing the drive to rotate to the desired position.

A position transducer 45 is preferably attached to the second end 43 of the axle 40 and precisely measures the orientation of the axle 40 and hence the blade 30 within the assembly 10. While the position transducer 45 is shown as a separate unit on an end of the axle 40 opposite the drive 44, it is conceivable that the drive 44 could be configured in such a manner that it itself communicates back to the controller its position relative to the axle 40 so that the drive 44 can both position the axle 40 and communicate with a controller the precise orientation of the blade 30.

The axle 40 preferably includes an interior 46 which is substantially hollow and includes appropriate air/gas lines therein for the passage of air/gas to a pressure sensor 60 or for otherwise transmitting a signal out of the blade 30. Alternatively, the air/gas lines can be routed from the blade 30 outside of the axle 40 and to the pressure sensor 60. The axle 40 includes a leading pressure port 48 and a trailing pressure port 49 which extend from the axle 40 on a portion thereof preferably outside the duct surrounding the damper assembly 10 which output air from opposite sides of the blade 30 for transmission to an appropriate pressure sensor 60.

With particular reference to FIGS. 1–3A, particular details of the sensing structure 50 are described. While the sensing structure 50 can have a variety of different configurations, the following sensing structure 50 is preferred. The sensing structure 50 includes two perpendicular portions 52 extending perpendicularly from the leading surface 32 of the blade 30. The two perpendicular portions 52 preferably are located near the ends 38 of the blade 30 and extend away from the leading surface 32 of the blade 30 sufficiently to be located at a position near where maximum flow rate would exist.

A parallel portion 54 extends between ends of the perpendicular portions 52 most distant from the leading surface 32. The parallel portion 54 preferably extends linearly parallel to the leading surface 32 and joins the two perpendicular portions 52 together. The perpendicular portions 52 and parallel portion 54 are hollow and can be formed by a single tube with appropriate bends to form transitions between the perpendicular portions 52 and the parallel portion 54. Preferably, the perpendicular portions 52 attach to the leading surface 52 on portions thereof which are equal distances from the axle 40 and relatively close to the axle 40.

A plurality of sensing holes 56 pass through walls of the sensing structure 50 on the parallel portion 54, all the way through into an interior of the parallel portion 54. Hence, air passing around the parallel portion 54 of the sensing structure 50 will have direct access to the sensing holes 56 forward of the leading surface 32 and increase a pressure within an interior of the parallel portion 54. This increased pressure is passed through the perpendicular portions 52. Preferably, the perpendicular portions 52 pass into the core 36 of the blade 30 and then into the axle 40 where a conduit leads to the leading pressure port 48 on the axle 40 and then through a leading pressure tube 62 to the pressure sensor 60. Alternatively, an absolute pressure sensor can be provided embedded within the sensing structure 50, the blade 30 or the axle 40 or a differential pressure sensor can be so placed.

A second sensing structure 50 extends from the trailing surface 34 which is preferably identical to the sensing structure 50 on the leading surface 52. However, the sensing structure 50 on the trailing surface 34 preferably has the sensing holes 56 facing in a different direction than the direction that the sensing holes 56 face on the leading surface sensing structure 50. Specifically, the sensing holes 56 on the sensing structure 50 attached to the leading surface 32 preferably face in a direction parallel to the leading surface 32 and directly upstream when the blade 30 is in a horizontal wide open orientation. Hence, the sensing holes 56 and the sensing structure 50 attached to the leading surface 32 of the blade 30 face perpendicular to the direction of flow when the blade 30 is in a totally closed orientation. In contrast, the sensing holes 56 on the sensing structure attached to the trailing surface 34 of the top blade 30 preferably face in a direction 180° opposed from that of the sensing holes 56 and the sensing structure 50 on the leading surface 32 of the blade 30.

Figure 8:
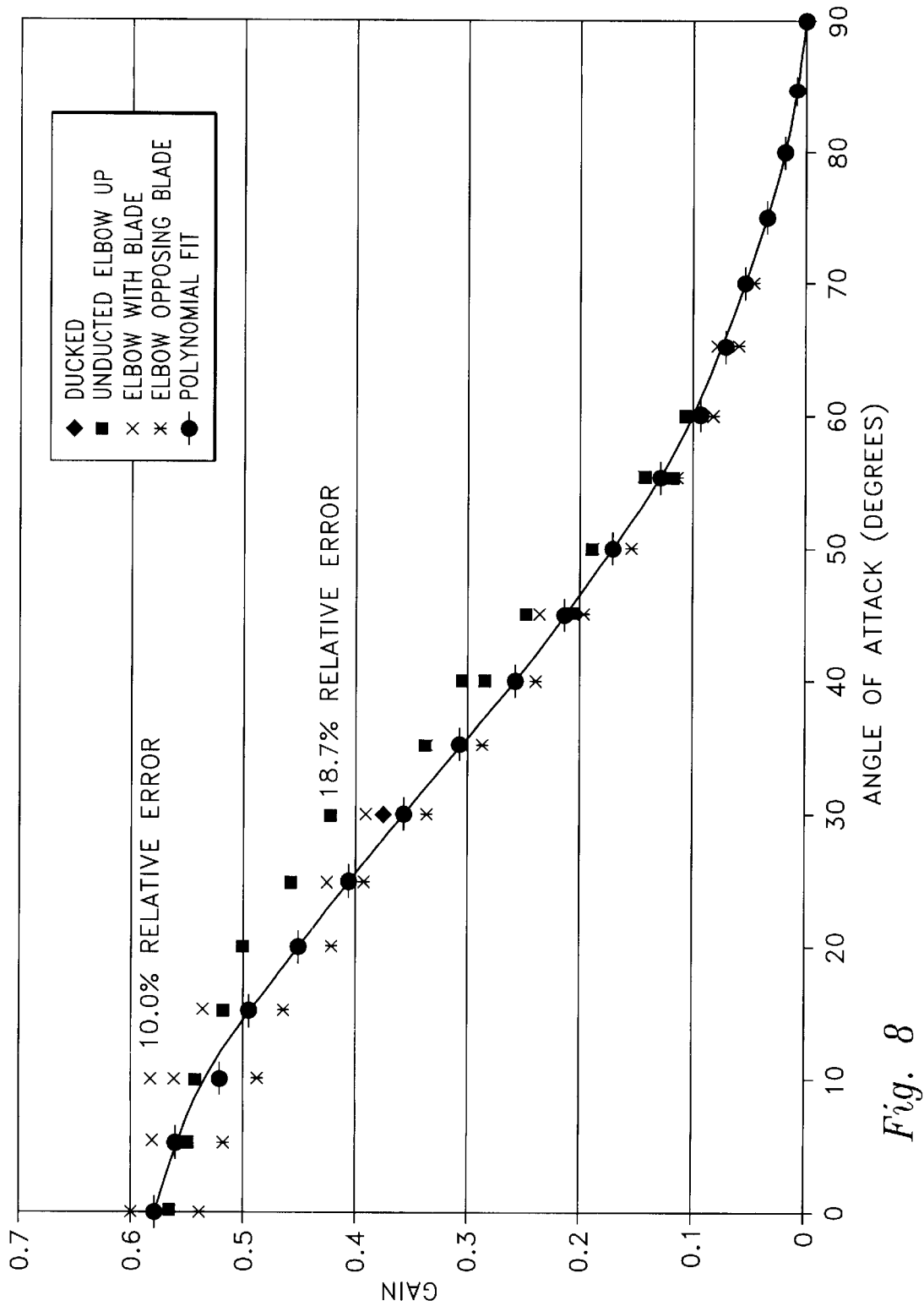
FIG. 8 is a graph of pressure differential signal gain versus blade angle of attack where an angle of attack of 0° indicates that the blade is approximately parallel to the direction of flow and the damper is wide open, and where 90° indicates that the damper blade is substantially vertical and the damper assembly is entirely closed.

While such a sensing hole 56 orientation is preferred, other sensing hole 56 orientations can be provided. An advantage of orienting the sensing holes 56 as preferred is that a maximum gain pressure differential signal is encountered when the blade 30 is in a wide open orientation (FIG. 8). When the blade 30 is in a partially closed orientation a relatively high pressure differential and hence relatively high sensitivity is provided for sufficient flow rate measurement accuracy. Even when the blade 30 is nearly closed (FIG. 4) the sensing structure 50 on the leading surface 32 still experiences some velocity induced pressure increase. While a velocity of air passing the edges 33, 35 may be relatively high when the blade 30 is nearly closed, a position of the sensing structure 50 on the trailing surface 34 of the blade 30 is sufficiently close to the axle 40 that substantially no velocity induced pressure effect is sensed. Hence, a differential is still measurable even when the blade 30 is in a nearly closed orientation.

Should circumstances dictate that sensing hole 56 orientations be other than 180° opposed, as indicated above, it is desirable that the holes not be oriented perpendicular to the surfaces 32, 34 so that a pressure differential is provided when the blade 30 is in a totally open orientation. It is undesirable that the sensitivity provided by the flow rate measurement pressure sensor 60 be at a minimum when particularly high flow rates are being measured, such as when the blade 30 is open. It is also desirable that the sensing structure 50 provide the sensing holes 56 sufficiently far from the surface 32, 34 so that a measurement as it exists within the flow stream is provided rather than in any boundary layer closer to the blade 30. The greater the velocity where the sensing holes 56 on the leading surface 32 are provided, the stronger the signal upon which to base a flow rate measurement.

The sensing structure 50 on the trailing surface 34 communicates through the core 36 of the blade 30, through the interior 46 of the axle 40 and through to the trailing pressure port 39 of the axle 40. A trailing pressure tube 64 leads from the trailing pressure port 49 to the pressure sensor 60. Alternatively, the sensing structure 50 can be coupled to the pressure sensor 60 through an air/gas line on an exterior of the blade 30 and an axle 40. As another alternative, the sensing structure 50 could be off of the blade 30 and downstream of the blade 30.

The pressure sensor 60 is preferably a differential pressure sensor which measures a difference in pressure between the sensing holes 56 spaced from opposite surfaces 32, 34 of the blade 30. Alternatively, the pressure sensor 60 can be in the form of dual absolute pressure sensors. It is conceivable that a differential pressure sensor or dual absolute pressure sensors could either be provided outside the assembly 10 or inside the assembly, or even embedded within the core 36 of the blade 30 itself. It is also conceivable that wireless transmission could be utilized so that the differential pressure signal could be transmitted to a controller without requiring complex wiring or air pressure delivery hoses.

With particular reference to FIG. 8, details regarding the signals generated by the pressure sensor 60 and the position transducer 45 and their interpretation as a flow rate are described. Because the sensing holes 56 are mounted to surfaces of a blade 30 which itself may be in a variety of different orientations, it is conceivable that the sensing holes 56 might measure a common pressure differential for two different blade 30 orientations but that the actual flow rates past the blade 30 would be different in those two situations. Hence, accurate flow rate measurement requires both measurement of blade orientation/angle of attack and pressure differential. Once the blade orientation is known and the pressure differential is known, the flow rate can be calculated.

Typically, a damper assembly 10 fitted with the sensing structure 50 of this invention would be calibrated and the results of this calibration would be encoded into the controller so that the controller would automatically calculate the flow rate when the orientation of the blade 30 is known and when the pressure differential detected by the pressure sensor 60 is known.

This calibration information could be programmed into an application specific integrated circuit (ASIC) or into a programmable memory device or some other form of logic device, as is known in the art, so that the controller can act as a calculator to calculate the flow rate from the pressure differential and blade 30 orientation. Alternatively, the calculator can take the form of a graph or tables of flow rate and blade 30 orientation. A user could then manually look up the flow rate by use of the graph or tables. The flow rate measurement information can then otherwise be used by the controller in accordance with the specific program for operation of the ventilation system according to its design.

FIG. 8 specifically shows measurements which were taken in actual tests of a damper assembly 10 fitted with a sensing structure 50 analogous to that shown in FIG. 3, but for a damper assembly 10 with a single blade/damper and a circular cross-section. Tests were performed with different conditions surrounding the damper assembly to determine how closely the measurements remained true to a curve fit to measurements taken by the damper assembly when in a smoothly ducted section of air handling equipment. In the most unusual of upstream and downstream environments into which the damper assembly was placed, a maximum deviation of 18.7% from other readings was obtained. Hence, relatively precise flow rate measurements were exhibited even for unusual duct configurations into which the damper assembly was placed.

With particular reference to FIG. 6, details of a first alternative embodiment of this invention are described. In this first alternative embodiment a streamlined damper 110 is provided. Because the streamlined damper 110 has a leading contoured surface 132 and a trailing contoured surface 134, it is possible to have a leading pressure tap 136 embedded within the leading contoured surface 132 and a trailing pressure tap 138 embedded within the trailing contoured surface 134 and still maintain the taps 136, 138 facing in directions non-perpendicular away from a central line between the two surfaces 132, 134 and spaced from leading and trailing edges of the streamlined damper 110. The taps 136, 138 avoid the extreme turbulence at the edges of the damper 110 and face non-perpendicularly relative to the direction of air flow when the damper 110 is in a wide open horizontal orientation. Hence, some sensitivity is still provided when the streamlined damper 110 is in a wide open orientation and a position for the taps 136, 138 is away from the edges.

In this alternative embodiment, an axle 140 supports the streamlined damper 110 and a pressure sensor 160 is embedded within the streamlined damper 110 with a leading pressure tube 162 leading from the leading pressure tap 136 to the pressure sensor 160 and a trailing pressure tube 164 extending from the trailing pressure tap 138 to the pressure sensor 160. Thus, this first alternative embodiment illustrates how the pressure sensor 160 can be located within the damper/blade 110 and how the pressure taps 136, 138 can be adjacent the surfaces 132, 134 in some situations, rather than being supported upon the sensing structure 50 of the preferred embodiment, and still provide some of the benefits of the preferred embodiment of this invention.

With particular reference to FIG. 7, details of a second alternative embodiment are provided. A rectangular cross-section damper 210 is provided. The rectangular cross-section damper 210 includes a leading flat surface 232 opposite a trailing flat surface 234 and a leading pressure tap 236 opposite a trailing pressure tap 238. As with the first alternative embodiment, the second alternative embodiment includes an axle 240 and has a pressure sensor 260 embedded within the damper 210 with a leading pressure tube 262 leading from the pressure sensor 260 to the leading pressure tap 236 and a trailing pressure tube 264 extending from the pressure sensor 260 to the trailing pressure tap 238.

With this second alternative embodiment, the taps 236, 238 face perpendicularly from the surfaces 232, 234 of the damper 210. This arrangement is effective for most orientations of the damper 210 and is potentially of simpler overall design. However, when the damper 210 is in a horizontal wide open orientation no pressure differential is detected between the taps 236, 238, regardless of the flow rate. Hence, the second alternative embodiment would typically be utilized in air handling equipment where the damper 210 is never required to go to a wide open orientation or where the duct had a sufficiently irregular orientation so that the air/gas flow was never equally on both sides of the damper 210.

The second alternative embodiment would have no meaningful pressure signal at low angles of attack. This would correspond with extremely high gain. The damper 210 shown in the second alternative embodiment might provide particularly accurate readings in low flow rate conditions where the damper 210 is close to a closed orientation.

The various different configurations of the alternative embodiments could be combined with various different features of the preferred embodiment for the assembly 10, depending on the particular needs of the ventilation system being provided. Also, portions of the various embodiments could be used above and still provide some benefits. For instance, the blade 30 could have the sensing structure 50 only adjacent the leading surface 32 and merely a pressure tap similar to the trailing surface pressure tap 238 on the trailing surface 34.

This disclosure is provided to reveal preferred embodiments of the invention and a best mode for practicing the invention. Having thus described the invention in this way, it should be apparent that various different modifications can be made to the preferred embodiment without departing from the scope and spirit of this disclosure. For instance, the invention can be adapted using known fluid mechanics principles to operate within a liquid handling system. The damper would be in the form of a valve for controlling liquid flow. Also, parts between conduits, such as those leading to the pressure sensor 60 would typically require seals to restrict fluid leakage. When structures are identified as a means to perform a function, the identification is intended to include all structures which can perform the function specified.

What is claimed is:

1. A damper for both controlling fluid flow through a duct and measuring a flow rate of the fluid past the damper, comprising in combination:

at least one damper vane having a leading surface facing at least partially upstream at least some of the time and a trailing surface facing at least partially downstream at least some of the time;

said damper vane configured to be pivotably mounted within the duct such that said damper vane can rotate between different positions;

said different positions of said damper vane having a unique amount that said different positions of said damper vane control flow of the fluid through the duct;

a damper vane rotational position sensor;

a first pressure sensor positioned to sense fluid pressure at a location on an upstream side of said damper vane and coupled to said damper vane;

a second pressure sensor positioned to sense fluid pressure at a location on a downstream side of said damper vane and coupled to said damper vane; and a fluid flow rate calculator coupled to said first pressure sensor, said second pressure sensor and said damper rotational position sensor, said calculator configured to determine fluid flow rate past said damper vane from inputs provided by said first pressure sensor, said second pressure sensor and a position of said damper vane provided by said damper vane position sensor.

2. The damper of claim 1 wherein said first pressure sensor includes a first pressure sensing pick-up located on an upstream side of said damper vane, and wherein said second pressure sensor includes a second pressure sensing pick-up located on a downstream side of said damper vane.

3. The damper of claim 2 wherein a differential pressure sensor is coupled to said first pressure sensing pick-up and said second pressure sensing pick-up, said differential pressure sensor measuring a difference in pressure between fluids within said first pressure sensing pick-up and fluids within said second pressure sensing pick-up, said difference provided to said calculator for calculating the fluid flow rate, along with the rotational position of said damper vane provided by said damper vane position sensor.

4. The damper of claim 1 wherein said first pressure sensor is located to maintain contact with fluid on said upstream side of said damper vane for all damper vane rotational positions.

5. A damper for both controlling fluid flow through a duct and measuring a flow rate of the fluid past the damper, comprising in combination:

at least one damper vane having a leading surface facing at least partially upstream at least some of the time and a trailing surface facing at least partially downstream at least some of the time;

said damper vane configured to be pivotably mounted within the duct such that said damper vane can rotate between different positions;

said different positions of said damper vane having a unique amount that said different positions of said damper vane control flow of the fluid through the duct;

a damper vane rotational position sensor;

a first pressure sensor positioned to sense fluid pressure at a location on an upstream side of said damper vane and coupled to said damper vane;

a second pressure sensor positioned to sense fluid pressure at a location on a downstream side of said damper vane and coupled to said damper vane;

a fluid flow rate calculator coupled to said first pressure sensor, said second pressure sensor and said damper rotational position sensor, said calculator configured to determine fluid flow rate past said damper vane from inputs provided by said first pressure sensor, said second pressure sensor and a position of said damper vane provided by said damper vane position sensor;

wherein said first pressure sensor includes a first pressure sensing pick-up located on an upstream side of said damper vane, and wherein said second pressure sensor includes a second pressure sensing pick-up located on a downstream side of said damper vane; and wherein said first pressure sensing pick-up faces non-perpendicularly relative to said leading surface.

6. The damper of claim 5 wherein said first pressure sensing pick-up faces in a direction away from a directly downstream orientation for all damper vane positions between a totally closed position and a totally open position.

7. The damper of claim 5 wherein said first pressure sensing pick-up faces at least partially upstream for all positions of said damper vane between a totally closed position and a totally open position.

8. The damper of claim 7 wherein said first pressure sensing pick-up faces in a direction substantially parallel with said leading surface of said damper vane.

9. The damper of claim 5 wherein said first pressure sensing pick-up is spaced away from said leading surface of said damper vane on said upstream side of said damper vane.

10. The damper of claim 5 wherein said second pressure sensing pick-up faces in a direction away from an upstream direction for all damper vane positions.

11. The damper of claim 5 wherein both said first pressure sensing pick-up and said second pressure sensing pick-up are configured to lead to a differential pressure sensor, said differential pressure sensor measuring a difference in pressure between fluids within said first pressure sensing pick-up and fluids within said second pressure sensing pick-up, said differential pressure sensor coupled to said calculator.

12. The damper of claim 11 wherein said first pressure sensor includes at least two first pressure sensing pick-ups located on said upstream side of said damper and spaced from said leading surface of said damper, said at least two first pressure sensing pick-ups facing in a common direction and leading to a common first pressure space leading to said differential pressure sensor.

13. The damper of claim 5 wherein said damper includes:

a fluid flow controller coupled to said damper vane;

said controller configured to rotate said damper vane between said different rotational positions;

said controller configured to receive a desired flow rate for the duct;

said controller configured to receive a measured flow rate through the duct provided by said fluid flow rate calculator; and said controller configured to rotate said damper vane toward a more closed position if the measured flow rate from said fluid flow rate calculator is higher than the desired flow rate and configured to rotate said damper vane to a more open position if the measured fluid flow rate from said fluid flow rate calculator is less than the desired fluid flow rite.

14. A damper for both controlling fluid flow through a duct and measuring a flow rate of the fluid past the damper, comprising in combination:

at least one damper vane having a leading surface facing at least partially upstream at least some of the time and a trailing surface facing at least partially downstream at least some of the time;

said damper vane configured to be pivotably mounted within the duct such that said damper vane can rotate between different positions;

said different positions of said damper vane having a unique amount that said different positions of said damper vane control flow of the fluid through the duct;

a damper vane rotational position sensor;

a first pressure sensor positioned to sense fluid pressure at a location on an upstream side of said damper vane and coupled to said damper vane;

a second pressure sensor positioned to sense fluid pressure at a location on a downstream side of said damper vane and coupled to said damper vane;

a fluid flow rate calculator coupled to said first pressure sensor, said second pressure sensor and said damper rotational position sensor, said calculator configured to determine fluid flow rate past said damper vane from inputs provided by said first pressure sensor, said second pressure sensor and a position of said damper vane provided by said damper vane position sensor; and wherein said first pressure sensor is spaced away from said leading surface of said damper vane on said upstream side of said damper vane.

15. A damper for both controlling gas flow through a duct and measuring a flow rate of the gas past the damper, comprising in combination:

at least one damper vane having a leading surface facing at least partially upstream and a trailing surface facing at least partially downstream;

said damper vane configured to be pivotably mounted within a conduit such as the duct such that said damper vane can rotate between different positions;

said different positions of said damper vane having a unique amount that said different positions of said damper vane control a rate of gas flow through the duct;

a damper vane rotational position sensor;

a first pressure sensing pick-up located on an upstream side of said damper vane and coupled to said damper vane;

said first pressure sensing pick-up facing non-perpendicularly relative to said leading surface;

a second pressure sensing pick-up located on a downstream side of said damper vane and coupled to said damper vane;

said first pressure sensing pick-up and said second pressure sensing pick-up both coupled to at least one pressure sensor, said at least one pressure sensor configured to generate at least one signal related to gas pressure at said first pressure sensing pick-up and said second pressure sensing pick-up; and a gas flow rate calculator coupled to said at least one pressure sensor in a manner receiving said at least one signal, and said gas flow rate calculator coupled to said damper vane rotational position sensor, said calculator configured to determine flow rate past said damper vane from said at least one pressure signal and said damper vane rotational position from said damper vane rotational position sensor.

16. The damper of claim 15 wherein said at least one pressure sensor includes a first pressure sensor coupled to said first pressure sensing pick-up, said first pressure sensor configured to generate a first signal correlating with the pressure of gas at said first pressure sensing pick-up, and a second pressure sensor coupled to said second pressure sensing pick-up, said second pressure sensor configured to generate a second pressure signal correlating with a pressure of the gas at said second pressure sensing pick-up, said first signal and said second signal each coupled to said calculator.

17. The damper of claim 15 wherein said at least one pressure sensor includes a differential pressure sensor coupled to both said first pressure sensing pick-up and said second pressure sensing pick-up, said differential pressure sensor generating at least one signal corresponding to a difference in pressure between a pressure of the gas at said first pressure sensing pick-up and a pressure of the gas at said second pressure sensing pick-up.

18. The damper of claim 15 wherein said damper vane is coupled to a damper vane position controller, said damper vane position controller configured to compare a gas flow rate calculated by said calculator with a desired gas flow rate through the duct and rotate the damper vane in a direction for the gas flow rate calculated by said calculator to match the desired gas flow rate.

19. The damper of claim 17 wherein said damper includes a plurality of first pressure sensing pick-ups each located on said upstream side of said damper vane, said plurality of first pressure sensing pick-ups each spaced from said leading surface of said damper vane within a common structure such that each of said plurality of first pressure sensing pick-ups lead to a common first pressure space, said first pressure space coupled to said differential pressure sensor.

20. The damper of claim 19 wherein each of said plurality of first pressure sensing pick-ups face in a common direction substantially parallel with said leading surface of said damper vane, said common structure configured as an elongate hollow bar having a distance upstream of said leading surface of said damper vane which is substantially constant, such that said plurality of first pressure sensing pick-ups are each a substantially similar distance away from said leading surface of said damper vane.

21. A method for measuring fluid flow rate through a fluid flow rate control device, the method including the steps of:

configuring the control device to include at least one damper vane rotatably mounted in a position to selectively block fluid flow past the damper vane by different amounts;

using at least one first pressure sensor in a position to measure fluid pressure upstream of a leading surface of the damper vane, the sensor facing at least partially upstream such that the at least one first pressure sensor senses a pressure caused both by a pressure of the fluid and a velocity of the fluid;

coupling the at least one first pressure sensor to the damper vane such that the at least one first pressure sensor rotates at least partially with the damper vane;

monitoring a position of the damper vane; and calculating a flow rate past the damper vane from pressure sensed by the at least one first pressure sensor and the position of the damper vane.

22. The method of claim 21 including the further steps of:

locating a second pressure sensor within the fluid adjacent the damper vane;

orienting said second pressure sensor in a different direction than said at least one first pressure sensor for a majority of damper vane rotational positions; and said calculating step having the step of including a pressure provided by said second pressure sensor in calculating the flow rate past the damper vane.

23. The method of claim 22 wherein said calculating step includes the steps of:

determining a difference between pressure sensed by said at least one first pressure sensor of said placing step and said second pressure sensor; and correlating the pressure difference of said determining step to the flow rate of the fluid past the damper vane.

24. The method of claim 22 wherein the second pressure sensor is located downstream of a trailing surface of the damper vane that faces at least partially downstream, the second pressure sensor coupled to the damper vane such that the second pressure sensor rotates with the damper vane.

25. The method of claim 24 wherein said at least one first pressure sensor of said placing step and said second pressure sensor face in opposite directions.

26. The method of claim 22 wherein said calculating step includes the further step of adjusting a signal received from the at least one first pressure sensor of said placing step based on the position of the damper vane determined by said monitoring step.

27. The method of claim 26 wherein said adjusting step includes identifying a gain curve for a pressure signal provided by the at least one first pressure sensor of said placing step and modifying the pressure signal to account for the gain associated with the damper vane rotational position.

28. The method of claim 21 wherein said using step includes the step of locating the at least one first pressure sensor in a location which maintains contact with the fluid upstream of the leading surface of the damper vane for all damper vane rotational positions.

29. A method for measuring fluid flow rate through a fluid flow rate control device, the method including the steps of:

configuring the control device to include at least one damper vane rotatably mounted in a position to selectively block fluid flow past the damper vane by different amounts;

using at least one first pressure sensor in a position to measure fluid pressure upstream of a leading surface of the damper vane, the sensor facing at least partially upstream such that the at least one first pressure sensor facing at least partially a pressure of the fluid and a velocity of the fluid;

coupling the at least one first pressure sensor to the damper vane such that the at least one first pressure sensor rotates at least partially with the damper vane;

monitoring a position of the damper vane;

calculating a flow rate past the damper vane from pressure sensed by the at least one first pressure and the position of the damper vane;

locating a second pressure sensor within the fluid adjacent the damper vane;

orienting said second pressure in a different direction than said at leas tone first pressure sensor for a majority of damper vane rotational positions;

said calculating step having the step of including a pressure provided by said second pressure sensor in calculating the flow rate past the damper vane;

wherein the second pressure sensor is located downstream, the second pressure sensor coupled to the damper vane such that the second pressure sensor rotates with the damper vane; and wherein said placing step includes the further step of orienting said at least one first pressure sensor non-perpendicular to the leading surface of the damper vane.

30. The method of claim 29 wherein said placing step includes the further step of orienting the at least one first pressure sensor facing substantially parallel to the leading surface of the damper vane.

31. The method of claim 29 wherein said placing step includes the further step of spacing the at least one first pressure sensor away from the leading surface of the damper vane in an upstream direction.

32. A method for measuring fluid flow rate through a fluid flow rate control device, the method including the steps of:

configuring the control device to include at least one damper vane rotatably mounted in a position to selectively block fluid flow past the damper vane by different amounts;

using at least one first pressure sensor in a position to measure fluid pressure upstream of a leading surface of the damper vane, the sensor facing at least partially upstream such that the at least one first pressure sensor senses a pressure caused both by a pressure of the fluid and a velocity of the fluid;

coupling the at least one first pressure sensor to the damper vane such that the at least one first pressure sensor rotates at least partially with the damper vane;

monitoring a position of the damper vane;

calculating a flow rate past the damper vane from pressure sensed by the at least one first pressure sensor and the position of the damper vane; and configuring the at least one first pressure sensor and the second pressure sensor to each include a sensor pick-up with an orientation of the at least one first pressure sensor of said placing step and the second pressure sensor being a direction aligned with a center line passing into the sensor pick-ups, the sensor pick-ups leading to at least one pressure sensor calculating a pressure of fluid passing through the sensor pick-ups.

33. A method for measuring fluid flow rate through a fluid flow rate control device, the method including the steps of:

configuring the control device to include at least one damper vane rotatably mounted in a position to selectively block fluid flow past the damper vane by different amounts;

using at least one first pressure sensor in a position to measure fluid pressure upstream of a leading surface of the damper vane, the sensor facing at least partially upstream such that the at least one first pressure sensor senses a pressure caused both by a pressure of the fluid and a velocity of the fluid;

coupling the at least one first pressure sensor to the damper vane such that the at least one first pressure sensor rotates at least partially with the damper vane;

monitoring a position of the damper vane;

calculating a flow rate past the damper vane from pressure sensed by the at least one first pressure sensor and the position of the damper vane; and wherein said placing step includes the further step of orienting said at least one first pressure sensor non-perpendicular to the leading surface of the damper vane.

* * * * *